(12) United States Patent
Matsuda et al.

(10) Patent No.: US 7,052,040 B2
(45) Date of Patent: May 30, 2006

(54) GAS GENERATOR FOR AIR BAG

(75) Inventors: Naoki Matsuda, Himeji (JP); Masayuki Yamazaki, Himeji (JP)

(73) Assignee: Daicel Chemical Industries, LTD, Osaka (JP)

( * ) Notice: Subject to any disclaimer, the term of this patent is extended or adjusted under 35 U.S.C. 154(b) by 262 days.

(21) Appl. No.: 10/728,758

(22) Filed: Dec. 8, 2003

(65) Prior Publication Data

US 2005/0001414 A1 Jan. 6, 2005

Related U.S. Application Data

(60) Provisional application No. 60/432,660, filed on Dec. 12, 2002.

(30) Foreign Application Priority Data

Dec. 9, 2002 (JP) .............................. 2002-356702

(51) Int. Cl.
*B60R 21/26* (2006.01)
(52) U.S. Cl. ....................... 280/741; 280/736; 102/531
(58) Field of Classification Search ................ 280/741, 280/736, 737; 102/530, 531; B60R 21/26
See application file for complete search history.

(56) References Cited

U.S. PATENT DOCUMENTS

| | | | | |
|---|---|---|---|---|
| 6,142,515 A | * | 11/2000 | Mika | 280/736 |
| 6,626,461 B1 | * | 9/2003 | Koga et al. | 280/736 |
| 6,709,012 B1 | * | 3/2004 | Tanaka et al. | 280/736 |
| 6,722,694 B1 | | 4/2004 | Nakashima et al. | |
| 6,857,658 B1 | * | 2/2005 | Iwai et al. | 280/741 |
| 2001/0001523 A1 | * | 5/2001 | Green et al. | 280/736 |
| 2002/0063420 A1 | | 5/2002 | Nakashima et al. | |
| 2002/0175509 A1 | | 11/2002 | Iwai et al. | |

FOREIGN PATENT DOCUMENTS

| | | |
|---|---|---|
| DE | 19725418 A1 | 12/1998 |
| DE | 19731220 A1 | 1/1999 |
| JP | 9-66795 A | 3/1997 |
| JP | 9-95202 A | 4/1997 |
| JP | 10-324219 A | 12/1998 |
| JP | 2000-296756 A | 10/2000 |
| WO | WO 00/48868 A1 | 8/2000 |
| WO | WO 01/72561 A1 | 10/2001 |
| WO | WO-02/36395 A1 | 5/2002 |

\* cited by examiner

*Primary Examiner*—Paul N. Dickson
*Assistant Examiner*—Tiffany Webb
(74) *Attorney, Agent, or Firm*—Birch, Stewart, Kolasch & Birch, LLP

(57) ABSTRACT

The present invention provides a gas generator for an air bag where an operation performance is excellent and an amount of NOx generation is reduced. When a flame from a second igniter 32 advances just upwardly to ignite and burn a transfer charge 36, flame-transferring holes 46 communicating with a second combustion chamber 25 are not exactly opposite to the advancing direction of the flame. Therefore, after the whole of the transfer charge 36 is burnt, large ignition energy is discharged from the flame-transferring holes 46 into the second combustion chamber 25.

8 Claims, 2 Drawing Sheets

GAS GENERATOR FOR AIR BAG

This Nonprovisional application claims priority under 35 U.S.C. § 119(e) on U.S. Provisional Application No. 60/432,660 filed on Dec. 12, 2002 and under 35 U.S.C. § 119(a) on Patent Application No. 2002-356702 filed in Japan on Dec. 9, 2002, the entire contents of which are hereby incorporated by reference.

TECHNICAL FIELD TO WHICH THE INVENTION BELONGS

The present invention relates to a gas generator for an air bag which protects a passenger from the impact.

PRIOR ART

Various demands are presented to a gas generator for an air bag assembled into an air bag system mounted to an automobile in view of passenger protection. The demands include such a demand that the gas generator can reliably be activated for a period of 10 years or more which is an ordinary life of a vehicle to be mounted therewith, and the like.

For size-reduction of a gas generator, it is desirable to use a gas generating agent with a low combustion temperature, which allows coarse structure of a coolant/filter. On the other hand, in view of ensuring reliability of activation, it is required that ignitability and flammability of the gas generating agent are excellent.

However, a gas generating agent having a low combustion temperature is poor in ignitability generally. Therefore, to suppress generation of a harmful gas and to improve ignitability and flammability of the gas generating agent in order to secure the operational reliability are contradicting technical objects.

As a technique relating to the present invention, JP-A 10-324219 is known.

DISCLOSURE OF THE INVENTION

An object of the present invention is to provide a gas generator for an air bag which achieves reduction of a generation amount of a harmful gas such as NOx or the like at the time of activation and improves flammability of a gas generating agent and that can also ensure reliability of activation.

The invention provides, as a means for solving the problem, a gas generator for an air bag comprising a housing having a gas discharge port, first and second ignition means activated by the impact, and first and second combustion chambers accommodating gas generating agents which are ignited and burnt to generate combustion gases, wherein the first ignition means has a first igniter and a first transfer charge inside a first ignition means chamber, and the gas generating agent inside the first combustion chamber is ignited and burnt by ignition energy due to combustion of the first transfer charge inside the first ignition means chamber, the second ignition means has a second igniter and a second transfer charge inside a second ignition means chamber, and the gas generating agent inside the second combustion chamber is ignited and burnt by ignition energy due to combustion of the second transfer charge inside the second ignition means chamber, the first and second igniters are arranged in parallel in the radial direction of the housing, and the first and second combustion chambers are arranged concentrically inside the housing, and advancing directions of flames produced when the first and second igniters are activated are not exactly opposite to communication holes for guiding ignition energies produced from the first and second ignition means chambers to the first and second combustion chambers. In this case, the ignition energy defined in the present invention is a flame or a combustion gas with a high temperature produced due to combustion of the transfer charge, or the like.

When the advancing directions of flames occurring at activation of the first and second igniters are exactly opposite to the positions of the communication holes, an amount of flame generated by activation of the igniter and discharged directly from the communication hole outside the ignition means chamber is increased and flame movement inside the ignition means chamber becomes poor, therefore, ignition of the transfer charge becomes insufficient.

In view of the above, as the present invention, by employing such a constitution that the advancing direction of a flame and the position of the communication hole are not exactly opposite to each other, flame movement inside the ignition means chamber becomes excellent and therefore the ignitability of the transfer charge can be improved.

The invention provides, as another means for solving the problem, a gas generator for an air bag comprising a housing having a gas discharge port, first and second ignition means activated by the impact, and first and second combustion chambers accommodating gas generating agents which are ignited and burnt to generate combustion gases are accommodated, wherein the first ignition means has a first igniter and a first transfer charge inside a first ignition means chamber, and the gas generating agent inside the first combustion chamber is ignited and burnt by ignition energy due to combustion of the first transfer charge inside the first ignition means chamber, the second ignition means has a second igniter and a second transfer charge inside a second ignition means chamber, and the gas generating agent inside the second combustion chamber is ignited and burnt by ignition energy due to combustion of the second transfer charge inside the second ignition means chamber, the first and second igniters are arranged in parallel in a radial direction of the housing, the first and second transfer charges are arranged vertically in the axial direction of the housing, and the first and second combustion chambers are arranged concentrically inside the housing, and advancing directions of flames produced when the first and second igniters are activated are not exactly opposite to communication holes for guiding ignition energies produced from the first and second ignition means chambers to the first and second combustion chambers.

In the invention, since layouts of the first and second igniters, the first and second transfer charges, and the first and second combustion chambers are related mutually, an operation similar to the above described invention can be conducted and the entire gas generator can further be reduced in size.

In the above invention, it is preferable that, after ignition energy occurring from the first ignition means chamber is discharged in the radial direction of the housing, it advances in the axial direction of the housing, and ignition energy occurring from the second ignition means chamber is discharged in the axial direction of the housing.

When the discharging direction of the ignition energy is restricted in this manner, movement of the ignition energy inside the combustion chamber becomes excellent, so that ignitability of the gas generating agent is improved.

The above inventions are applied suitably to a case in which, as the gas generating agent, one with a low combustion temperature, for example, one having a combustion temperature in the range of 1000 to 1700° C. is used.

When the advancing directions of flames generated by activations of the first and second igniters are exactly opposite to the positions of the communication holes, such an event occurs that before ignition energy from the igniter ignites the entire transfer charge, the energy is discharged from communication hole to flow in the combustion chamber. At this time, energy (a flame, a high temperature gas or the like) generated from a portion of the ignited transfer charge is also discharged from the communication hole to the combustion chamber, but the energy is caused by combustion of only part of the transfer charge, which results in shortage of ignition energy to a gas generating agent having a low ignitability (with a low combustion temperature). Accordingly, when a gas generating agent having a low combustion temperature is used, by arranging communication hole as the above inventions, all energies due to the ignition of transfer charge can be supplied to the gas generating agent so that the ignitability and flammability of the gas generating agent can be improved.

In the above invention, it is preferable that an inner cylinder is disposed inside the housing, the first combustion chamber is provided outside the inner cylinder, the two ignition means are provided on a lower side inside the inner cylinder and the second combustion chamber is further provided on an upper side inside the inner wall.

In the above invention, it is preferable that the first combustion chamber and the first ignition means chamber are communicated with each other via the communication hole provided at a lower portion of the inner cylinder and the first combustion chamber and the second combustion chamber are communicated with each other via a communication hole provided at an upper portion of the inner cylinder.

In the above invention, it is preferable that a retainer for restricting a flow direction of a combustion gas is arranged inside the second combustion chamber, and that the retainer is arranged to have a gap between the retainer and an inner wall of the second combustion chamber.

By providing the gap between the retainer and the inner wall of the second combustion chamber, the discharge hole (the communication hole between the first combustion chamber and the second combustion chamber) of the combustion gas inside the second combustion chamber is prevented from being closed by the gas generating agent. In a case in which the communication hole is closed by the gas generating agent, when an internal pressure inside the second combustion chamber excessively rises in an initial stage of combustion and the gas generating agent closing the communication hole is burnt, the inner pressure lowers rapidly due to opening of the communication hole, so that a stable flammability may be deteriorated.

It is preferable that an opening portion for discharging a gas of the second combustion chamber is provided in a peripheral wall portion of the retainer and that the opening portion is closed before combustion of the gas generating agent inside the second combustion chamber.

By closing the opening portion of the retainer before activation, the internal pressure inside the second combustion chamber can be elevated up to a proper extent at the time of activation, so that an initial flammability of the gas generating agent is improved.

As the structure of the gas generator is improved, even in a case in which a gas generating agent having a low combustion temperature and a poor ignitability is used for reducing a generation amount of a harmful gas such as Nox or the like at the time of activation, the gas generating agent of the present invention can secure ignitability similar to a case in which a gas generating agent having a high combustion temperature and an excellent ignitability is used.

For this reason, reliability of activation as well as reduction in NOx generation amount at the time of activation can be ensured, and size-reduction of a gas generator can further be achieved.

DESCRIPTION OF NUMERALS

Figure 1:
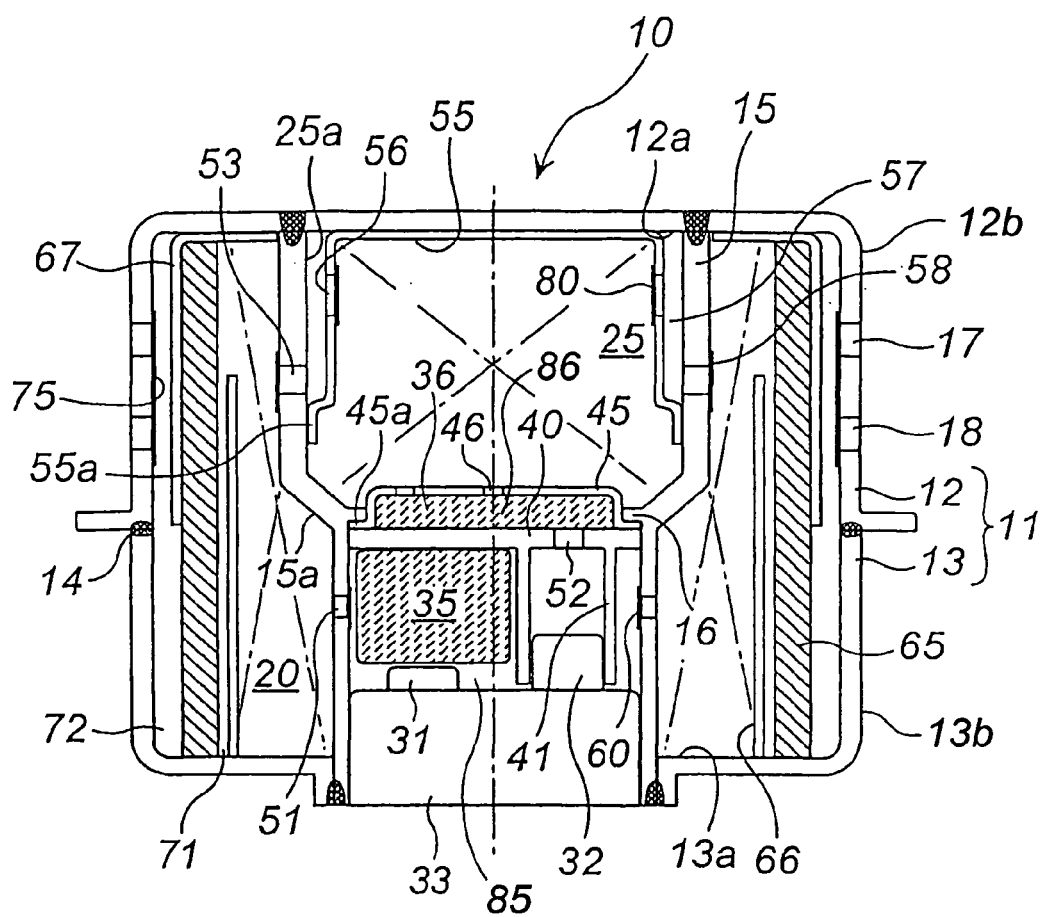
FIG. 1 is an axial sectional view of a gas generator for an air bag.

10 gas generator for an air bag
11 housing
15 inner cylinder
20 first combustion chamber
25 second combustion chamber
31 first igniter
32 second igniter
35 first transfer charge
36 second transfer charge
45 aluminum cup
46 flame-transferring hole
52 second through-hole
65 filter

EMBODIMENTS OF THE INVENTION

Embodiments of the present invention will be explained below with reference to the drawings. FIG. 1 is an axial sectional view of a gas generator for an air bag of the present invention. Incidentally, in the following explanation, a vertical relationship such as "upper" or "lower" is indicated with reference to FIG. 1, "the axial direction" means the axial direction of a housing, and "the radial direction means" the radial direction of the housing.

In a gas generator 10, an outer shell container is formed by a housing 11 formed by joining a diffuser shell 12 and a closure shell 13 which forms an inner accommodating space together with the diffuser shell 12. The diffuser shell 12 and the closure shell 13 are welded at a welding portion 14. In FIG. 1, other black pained portions also indicate welding portions.

The diffuser shell 12 is provided with a required number of gas discharging ports 17 and 18. The gas discharging ports 17 and 18 may have the same diameter or may have different diameters.

An inner cylinder 15 in a substantially cylindrical shape is arranged inside the housing 11, an upper end peripheral edge of the inner cylinder 15 is joined to a ceiling surface 12a of the diffuser 12, a lower end peripheral edge thereof is joined to a bottom surface 13a of the closure shell 13, so that inner and outer spaces are separated from each other.

The inner cylinder 15 has a radially increasing diameter by an inclined wall portion 15a such that an inner diameter of an upper portion (in the ceiling surface 12a side) becomes larger than an inner diameter of a lower portion (in the bottom surface 13a side). By setting the shape of the inner cylinder 15 in this manner as shown in FIG. 1, the volume of the inner space, in particular, a volume ratio of a first combustion chamber 20 and a second combustion chamber 25 can be adjusted (for example, in the range of 4/6 to 9/1, preferably 1/1 to 8/2) while keeping the height of the gas generator 10 low, which is preferable.

The annular (or cylindrical) first combustion chamber 20 is provided in an outside space of the inner cylinder 15, and an unillustrated first gas generating agent is accommodated therein.

The second combustion chamber 25 in which an unillustrated second gas generating agent is accommodated is provided in an upper space of the inner cylinder 15, and an ignition means chamber in which two ignition means are accommodated is provided in a lower space thereof.

A first igniter 31 and a first transfer charge 35 are disposed in the first ignition means chamber 85, and a second igniter 32 and a second transfer charge 36 are disposed in the second ignition means chamber 86. The first igniter 31 and the second igniter 32 are fixed to a single collar 33, and they are mounted in parallel in the radial direction. Incidentally, in a case in which an air bag module including the gas generator 10 is mounted to a vehicle, the first igniter 31 and the second igniter 32 are connected to a power supply (a battery) via connectors and lead wires.

The upper and lower spaces inside the inner cylinder 15, namely the second combustion chamber 25, and the first igniter 31 and second igniter 32 are separated by a flat plate-like partition wall 40 having a skirt portion 41 and a second through-hole 52. Since the flat plate-like partition wall 40 is fitted to a step-notched portion 16 of the inner cylinder 15 from the lower side thereof, even when the first igniter 31 is activated, the flat plate-like partition wall is prevented from moving upwardly due to a pressure at the time of activation. An inner diameter of the skirt portion 41 is set to be substantially equal to a diameter of an igniting portion of the igniter 32, and the skirt portion 41 comes in close contact with and surrounds the igniting portion, so that a flame generated due to activation of the second igniter 32 straightly advances only in the direction of the second through-hole 52.

By arranging the flat plate-like partition wall 40 having this skirt portion 41, the second combustion chamber 25 and the two igniters are separated, and the first igniter 31 and the second igniter 32 are separated, so that ignition energy (a flame, a combustion gas and the like) generated due to activation of the first igniter 31 is prevented from entering the second ignition means chamber and further prevented from passing through the second through-hole 52 to enter the second combustion chamber 25.

A first transfer charge 35 charged in an aluminum cap is disposed just above the first igniter 31. A first through-hole 51 provided at a lower portion of the side wall of the inner cylinder 15 is for causing the first combustion chamber 20 and the first ignition means chamber to communicate with each other and it is provided at the position which is approximately exactly opposite to the center of the first transfer charge 35, but the advancing direction of a flame generated due to activation of the first igniter 31 is not exactly opposite to the first through-hole 51. A seal tape 60 made of aluminum or stainless steel is attached to the first through-hole 51 from the inside.

By arranging the first through-hole 51 and the first transfer charge 35 to be exactly opposite to each other, the entire of the first transfer charge 35 is burnt almost uniformly due to activation of the first igniter 31.

Further, since the first through-hole 51 is provided at the lower portion of the inner cylinder 15, after ignition energy produced due to combustion of the first transfer charge 35 is discharged in the radial direction, it is turned upward to flow out, so that ignitability of the whole first gas generating agent accommodated inside the first combustion chamber 20 is improved.

Figure 2:
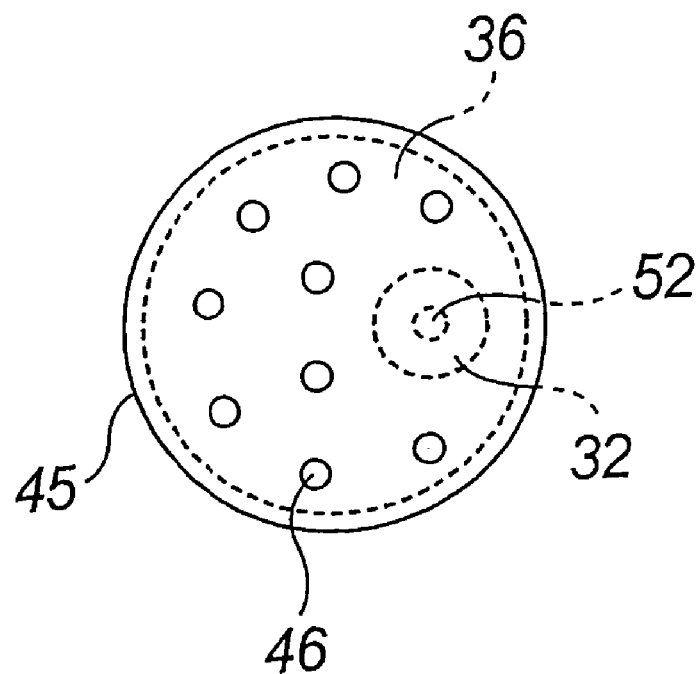
FIG. 2 is a schematic plan view for explaining layout of a second transfer charge in FIG. 1.

A layout of a second transfer charge 36 will be explained with reference to FIG. 2. FIG. 2 is a plan view showing a layout of a second transfer charge 36.

The second transfer charge 36 is disposed above the second igniter 32 and on the flat plate-like partition wall 40. The second transfer charge 36 is charged into an aluminum-made cup 45 having plural flame-transferring holes 46.

The aluminum cup 45 is one for retaining the second transfer charge 36 accommodated inside, a flange 45a extending in the radial direction is formed on an opening peripheral edge of the cup 45 and the cup 45 is fixed by vertically clamping the flange 45a with a step-notched portion 16 and the flat plate-like partition wall 40. As such a fixed structure is employed, the cup 45 is prevented from moving or falling off when the first and second transfer charges are burnt. As a result, since a flame from the igniter 32 can be guided to the entire second transfer charge 36 reliably, ignitability of the second transfer charge 36 is improved.

The plural flame-transferring holes 46 provided in the aluminum cup 45 are not exactly opposite to the advancing direction (just above the second igniter 32) of a flame produced due to activation of the second igniter 32.

By setting the positions of the frame-transferring holes 46 in this manner, when a flame produced when the second igniter 32 is activated advances just upwardly, while the flame is prevented from being discharged as it is, the second transfer charge 36 is first ignited and burnt and ignition energy produced due to the combustion of the entire second transfer charge 36 is discharged from the flame-transferring holes 46 into the second combustion chamber 25. For this reason, the ignitability of the second gas generating agent accommodated in the second combustion chamber 25 is improved.

Figure 3:
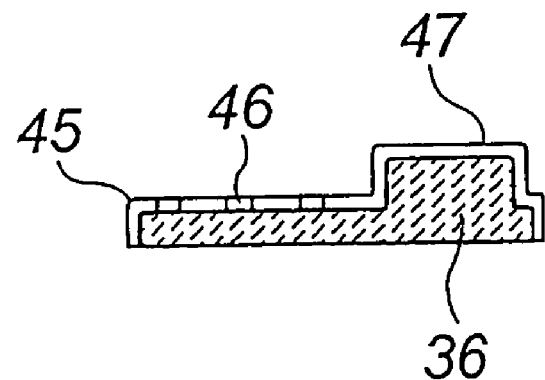
FIG. 3 is a schematic sectional view of another embodiment in FIG. 2.

As shown in FIG. 3, the aluminum cup 45 charged with the second transfer charge 36 can be formed to have a convex portion 47 at a portion thereof just above the second igniter 32. By providing such a convex portion 47, the amount of the second transfer charge 36 to be charged can be increased, so that the ignition performance of the second gas generating agent is further improved. In this case, even in an aspect shown in FIG. 3, the flame-transferring holes 46 are provided on a flat surface except for the convex portion 47, as shown in FIG. 2.

A cylindrical retainer 55 with a bottom is fitted into the second combustion chamber 25 in a state where its opening portion side is directed downward, and it is fixed at a side wall distal end portion 55a by pressing an inner wall 25a of the second combustion chamber 25. A gap 57 is provided between the side wall of the retainer 55 and the inner wall 25a of the second combustion chamber 25 to such an extent that a gas flow passage can be secured.

The retainer 55 has plural opening portions (nozzles) 56 on its side wall portion, and the height positions of the opening portions 56 in the axial direction are set to be positioned above the height positions of third through-holes 53.

The third through-holes 53 are closed from the outside thereof by a seal tape 58 made of stainless steel, and the opening portions 56 may also be closed from the inside thereof by a seal tape 80 made of aluminum or stainless steel. When the opening portions 56 are closed by the seal tape 80, in a case where the first combustion chamber 20 and the second combustion chamber 25 start burning simultaneously due to simultaneous activations of the two igniters, the internal pressure of the second combustion chamber 25 is temporarily elevated so that the ignitability of the second gas generating agent is improved. As the gap 57 is provided between the side wall of the retainer 55 and the inner wall 25*a* of the second combustion chamber 25, the third through-holes 53 are prevented from being closed by the second gas generating agent. If the third through-holes 53 are closed by the second gas generating agent, the internal pressure inside the second combustion chamber 25 excessively rises at the initial stage of combustion, and when the second gas generating agent closing the third through-holes 53 is burnt, the internal pressure lowers rapidly due to opening of the third through-holes 53, so that a stable flammability may be deteriorated.

By adjusting the height positions of the opening portions 56 and the third through-holes 53, as shown in FIG. 1, even in a case where the third through-holes 53 are provided at the lower side of the second combustion chamber 25, after a gas occurring due to combustion of the second gas generating agent passes through the opening portions 56 positioned at the upper side of the second combustion chamber 25, it is discharged from the third through-holes 53, so that flame movement around the entire interior of the second combustion chamber 25 becomes excellent and the flammability of the second gas generating agent is improved.

The total opening area of the third through-holes 53 is set to be smaller than the total opening area of the opening portions 56 and be further smaller than the total opening area of the gas discharging ports 17 and 18.

When the first igniter 31 is first activated and the second igniter 32 is activated with a delay therefrom, that is, when the first gas generating agent inside the first combustion chamber 20 is first burnt and the second gas generating agent inside the second combustion chamber 25 is burnt with a delay therefrom, the pressure inside the second combustion chamber 25 become sufficiently higher than the pressure inside the first combustion chamber 20. For this reason, by setting the total opening area of the third through-holes 53 as described above, the outflow speed of a combustion gas from the second combustion chamber 25 is controlled by the third through-holes 53, so that the internal pressure inside the second combustion chamber 25 at the time of combustion is also controlled by the third through-holes 53. Thereby, the combustion state inside the second combustion chamber 25 is controlled by the third through-holes 53. In this case, when the first igniter 31 and the second igniter 32 are activated simultaneously, as a pressure difference between the first combustion chamber 20 and the second combustion chamber 25 becomes small, the internal pressure of the second combustion chamber 25 is still higher than the first combustion chamber 20, but an influence of pressure control due to the third through-holes 53 becomes small.

By controlling the combustion state of the second combustion chamber 25 by the third through-holes 53 in this manner, the following effect can be obtained.

When only the first igniter 31 is activated to burn only the first gas generating agent such as when an automobile collides at a low speed, if the remaining second gas generating agent remains as it is, such a condition is dangerous at the time of scrapping the automobile. Therefore, in some cases, the second igniter 32 is activated to ignite and burn the second gas generating agent with the delay of about 100 milliseconds from the activation of the first igniter 31. In such a case, if the combustion state of the second combustion chamber 25 can be controlled by the third through-holes 53, since the ignitability and flammability of the second gas generating agent is improved and generation of a harmful gas such as NOx can be suppressed, which is preferable. Besides, prolonging a generation time of a combustion gas from the second combustion chamber 25 can also correspond to such an aspect where an inflation duration time of an air bag is prolonged.

A cylindrical filter 65 for removing combustion residue from the combustion gas and cooling the combustion gas is arranged between the first combustion chamber 20 and a peripheral wall of the housing 11 (a diffuser shell peripheral wall 12*b* and a closure shell peripheral wall 13*b*).

An inner cylindrical shielding plate 66 is arranged inside the cylindrical filter 65, and a gap (a first gap 71) is provided between the cylindrical filter 65 and the inner cylindrical shielding plate 66. In this case, instead of the gap, a portion (a portion having approximately the same width as the gap) of the inner cylindrical shielding plate 66 coming in contact with the cylindrical filter 65 is formed in a coarse structure so that a state similar to the case that the gap is provided may actually be achieved.

An outer cylindrical shielding plate 67 is arranged outside the cylindrical filter 65 in a state where it comes in contact with an outer peripheral surface of the cylindrical filter 65. A gap (a second gap 72) is provided between the outer cylindrical shielding plate 67 and a peripheral wall of the housing 11. It is preferable that the second gap 72 is set to be broader than the width of the first gap 71.

The inner cylindrical shielding plate 66 and the outer cylindrical shielding plate 67 do not cover the whole surface of the cylindrical filter 65, as shown in FIG. 1.

The inner cylindrical shielding plate 66 covers a lower portion (the height range of about ½ to ⅔ the total height of the cylindrical filter 65) of the cylindrical filter 65 in a state where one end peripheral edge portion thereof is caused to abut against the bottom surface 13*a*. Incidentally, a state similar to one shown in FIG. 1 may be achieved by covering the whole surface of the filter 65 with the inner cylindrical shielding plate 66 and providing plural ventilation holes on one portion of the inner cylindrical shielding plate.

The outer cylindrical shielding plate 67 covers an upper portion (the height range of about ½ to ⅔ the total height of the cylindrical filter 65) of the cylindrical filter 65 in a state where one end peripheral edge portion thereof is caused to abut against the ceiling surface 12*a*. Incidentally, a state similar to one shown in FIG. 1 may be achieved by covering the whole surface of the filter 65 with the outer cylindrical shielding plate 67 and providing plural ventilation holes on one portion of the outer cylindrical shielding plate.

By arranging the filter 65, the inner cylindrical shielding plate 66 and the outer cylindrical shielding plate 67 in this manner, filtering (filtration of combustion residue) and cooling functions to the combustion gas is further improved. The combustion gas generated in the first combustion chamber 20 and the second combustion chamber 25 enters the cylindrical filter 65 from a portion which is not covered with the inner cylindrical shielding plate 66, and after a portion of the gas moves in the axial direction inside the cylindrical filter 65 as it is, it reaches the second gap 72 to break the seal tape (made of aluminum or stainless steel) 75 and is then discharged from the gas discharging ports 17 and 18. Then, after the remaining portion of the combustion gas moves through the first gap 71, it passes through the interior of the cylindrical filter 65 in the radial direction to reach the second gap 72 and is discharged from the gas discharging ports 17 and 18.

In this case, the seal tapes 75 closing the gas discharging ports 17 and 18 can be set such that they are ruptured simultaneously or only part thereof is ruptured according to an activation state of the igniters (activation of only one of the igniters, activations of both the igniters, or activations of both the igniters with a time difference therebetween).

Next, an operation in a case in which two igniters are activated with a time difference therebetween in the gas generator for an air bag 10 will be explained with reference to FIGS. 1 and 2.

The transfer charge 35 is ignited and burnt by activation of the first igniter 31, and ignition energy ruptures the seal tape 60 and passes through the first through-holes 51 to be discharged into the first combustion chamber 20. At this time, after the ignition energy is discharged in the axial direction, it moves upwardly inside the first combustion chamber 20 and therefore the ignitability and flammability of the first gas generating agent is excellent. In this case, since the third through-holes 53 are closed by the seal tapes 58 made of stainless steel, the combustion gas inside the first combustion chamber 20 is prevented from flowing into the second combustion chamber 25.

According to a combination of the inner cylindrical shielding plate 66, the cylindrical filter 65 and the outer cylindrical shielding plate 67 and further functions of the first gap 71 and the second gap 72, the combustion gas generated in the first combustion chamber 20 ruptures part or all of the seal tapes 75 to be discharged from some of all of the gas discharging ports 17 and 18, thereby inflating an air bag.

The second igniter 32 is activated with a slight time difference. At this time, a flame advances through the second through-hole 52 straightly. However, since the advancing direction of the flame and the flame-transferring hole 46 are not exactly opposite to each other, after all of the second transfer charge 36 charged in the aluminum cup 45 is ignited and burnt, the ignition energy is discharged from the flame-transferring holes 46 into the second combustion chamber 25.

The second gas generating agent inside the second combustion chamber 25 is ignited and burnt by entrance of the ignition energy. However, as described above, since the height positions of the opening portions 56 of the retainer 55 and the third through-holes 53 are adjusted, flame movement to the whole combustion chamber 25 is excellent and ignitability and flammability of the second gas generating agent is excellent. Further, when the opening portions 56 are closed by the seal tapes 80, an initial flammability of the second gas generating agent is improved.

After a gas generated in the second combustion chamber 25 is discharged from the third through-holes 53 in the radial direction to flow into the first combustion chamber 20, it passes through the cylindrical filter 65 to be discharged from the gas discharging holes 17 and 18, thereby further inflating the air bag.

In the gas generator 10 of the present invention, a mixture of transfer charge powder and gas generating agent molded article is used as the first transfer charge 35 and the second transfer charge 36. Alternatively, the mixture can be used as the first transfer charge 35 and the gas generating agent molded article can be used as the second transfer charge 36. The gas generating agent molded article generates a gas of 1.2 mole/100 g or more at the time of combustion.

A mixture of boron and niter can be used as the transfer charge powder and the same material as the first and second gas generating agents can be used as the gas generating agent molded articles, but it is preferable to use a material having a combustion temperature higher than these materials and having an ignitability better than these materials.

It is preferable that a mass ratio of the transfer charge powder and the gas generating agent molded articles meets the transfer charge powder/gas generating agent molded article=2/8 to 8/2, preferably 3/7 to 7/3.

It is preferable that the gas generating molded article accommodated in the combustion chamber has the combustion temperature of 1000 to 1700° C., and it is preferable that the gas generating agent molded article used as the transfer charge has the combustion temperature of 1700 to 3000° C.

The invention claimed is:

1. A gas generator for an air bag comprising a housing having a gas discharge port, first and second ignition means activated by the impact, and first and second combustion chambers accommodating gas generating agents which are ignited and burnt to generate combustion gases, wherein
the first ignition means has a first igniter and a first transfer charge inside a first ignition means chamber, and the gas generating agent inside the first combustion chamber is ignited and burnt by ignition energy due to combustion of the first transfer charge inside the first ignition means chamber,
the second ignition means has a second igniter and a second transfer charge inside a second ignition means chamber, and the gas generating agent inside the second combustion chamber is ignited and burnt by ignition energy due to combustion of the second transfer charge inside the second ignition means chamber,
the first and second igniters are arranged in parallel in the radial direction of the housing, and the first and second combustion chambers are arranged concentrically inside the housing, and
advancing directions of flames produced when the first and second igniters are activated are not exactly opposite to communication holes for guiding ignition energies produced from the first and second ignition means chambers to the first and second combustion chambers.

2. A gas generator for an air bag comprising a housing having a gas discharge port, first and second ignition means activated by the impact, and first and second combustion chambers accommodating gas generating agents which are ignited and burnt to generate combustion gases are accommodated, wherein
the first ignition means has a first igniter and a first transfer charge inside a first ignition means chamber, and the gas generating agent inside the first combustion chamber is ignited and burnt by ignition energy due to combustion of the first transfer charge inside the first ignition means chamber,
the second ignition means has a second igniter and a second transfer charge inside a second ignition means chamber, and the gas generating agent inside the second combustion chamber is ignited and burnt by ignition energy due to combustion of the second transfer charge inside the second ignition means chamber,
the first and second igniters are arranged in parallel in the radial direction of the housing, the first and second transfer charges are arranged vertically in the axial direction of the housing, and the first and second combustion chambers are arranged concentrically inside the housing, and advancing directions of flames produced when the first and second igniters are activated are not exactly opposite to communication holes for guiding ignition energies produced from the first and second ignition means chambers to the first and second combustion chambers.

3. A gas generator for an air bag according to claim 1 or 2, wherein, after the ignition energy generated from the first ignition means chamber is discharged in the radial direction of the housing, the energy advances in the axial direction of the housing, and the ignition energy generated from the second ignition means chamber is discharged in the axial direction of the housing.

4. A gas generator for an air bag according to claim 1 or 2, wherein an inner cylinder is disposed inside the housing, an annular first combustion chamber is provided outside the inner cylinder, the two ignition means are provided at a lower side of the inner cylinder, the second combustion chamber is further provided at an upper side of the inner cylinder.

5. A gas generator for an air bag according to claim 1 or 2, wherein the first combustion chamber and the first ignition means chamber are communicated to each other via a communication hole provided at a lower portion of the inner cylinder, and the first combustion chamber and the second combustion chamber are communicated to each other via a communication hole provided at an upper portion of the inner cylinder.

6. A gas generator for an air bag according to claim 1 or 2, wherein a retainer for restricting a flow direction of the combustion gas is disposed inside the second combustion chamber, and the retainer is disposed with a distance from an inner wall of second combustion chamber.

7. A gas generator for an air bag according to claim 6, wherein an opening portion for discharging a gas inside the second combustion chamber is provided on a peripheral wall portion of the retainer, and the opening portion is closed before combustion of the gas generating agent inside the second combustion chamber.

8. A gas generator for an air bag according to claim 1 or 2, wherein a combustion temperature of the gas generating agent is in the range of 1000 to 1700° C.

* * * * *